(12) United States Patent
Izutsu et al.

(10) Patent No.: US 8,590,830 B2
(45) Date of Patent: Nov. 26, 2013

(54) PRESSURE TIGHT LARGE-SCALED MEMBRANE STRUCTURE

(75) Inventors: Naoki Izutsu, Sagamihara (JP); Kiyoho Matsushima, Shinagawa-ku (JP)

(73) Assignees: Japan Aerospace Exploration Agency, Tokyo (JP); Fujikura Parachute Company, Ltd, Tokyo (JP)

( * ) Notice: Subject to any disclaimer, the term of this patent is extended or adjusted under 35 U.S.C. 154(b) by 674 days.

(21) Appl. No.: 12/500,269

(22) Filed: Jul. 9, 2009

(65) Prior Publication Data

US 2010/0012772 A1 Jan. 21, 2010

(30) Foreign Application Priority Data

Jul. 15, 2008 (JP) ................................. 2008-184143

(51) Int. Cl.
*B64B 1/40* (2006.01)
*B64B 1/58* (2006.01)

(52) U.S. Cl.
USPC ........................................................ 244/31

(58) Field of Classification Search
USPC ................... 244/24, 31, 33, 125, 128, 158.3
See application file for complete search history.

(56) References Cited

U.S. PATENT DOCUMENTS

| | | | | |
|---|---|---|---|---|
| 3,277,724 A | * | 10/1966 | Lundeberg | 73/432.1 |
| 3,346,216 A | * | 10/1967 | Desmarteau | 244/30 |
| 3,391,882 A | * | 7/1968 | Johnson et al. | 244/158.3 |
| 3,405,886 A | * | 10/1968 | Gosnell et al. | 244/158.3 |
| 4,420,130 A | | 12/1983 | Regipa | |
| 4,434,958 A | * | 3/1984 | Rougeron et al. | 244/126 |
| 4,711,416 A | | 12/1987 | Regipa | |
| 5,115,998 A | * | 5/1992 | Olive | 244/31 |
| 6,685,136 B2 | * | 2/2004 | Yajima et al. | 244/31 |
| 2003/0106960 A1 | * | 6/2003 | Yajima et al. | 244/31 |
| 2008/0078883 A1 | * | 4/2008 | de Jong | 244/158.3 |
| 2009/0002257 A1 | * | 1/2009 | de Jong et al. | 343/872 |

FOREIGN PATENT DOCUMENTS

| | | | |
|---|---|---|---|
| EP | 1886920 A1 | | 2/2008 |
| EP | 2145821 A2 | * | 1/2010 |
| JP | 105410 A | | 3/1934 |
| JP | 60-248496 A | | 12/1985 |
| JP | 11-324412 A | | 11/1999 |
| JP | 2000-025695 A | | 1/2000 |
| JP | 2002-2595 A | | 1/2002 |
| JP | 2003-170897 A | | 6/2003 |
| JP | 2003-312589 A | | 11/2003 |
| JP | 2010023555 A | * | 2/2010 |

OTHER PUBLICATIONS

J.H. Smalley, "Development of the e-Balloon", The National Center for Atmospheric Research, pp. 167-176, Boulder, Colorado.
C.R. Calladine, "Stability of the 'Endeavour' Balloon", Elsevier Science Publishers, 1988, pp. 133-149, B.V., Amsterdam.

(Continued)

*Primary Examiner* — Joseph W Sanderson
(74) *Attorney, Agent, or Firm* — Sughrue Mion, PLLC

(57) ABSTRACT

A pressure tight large-scaled membrane structure includes a bag body having a plurality of gores attached to each other along an attachment line, and a plurality of first ropes attached over a predetermined range of the bag body in such a manner as to be orthogonal to the attachment line of the gores, whereby a cylindrical shaped portion is formed. The cylindrical shaped portion has a substantially circular cross-sectional area that is a maximum substantially circular cross-section of the bag body and the plurality of first ropes each having approximately the same length as a circumference of the substantially circular-cross section having a maximum area with respect to the bag body.

10 Claims, 5 Drawing Sheets

(56) References Cited

OTHER PUBLICATIONS

Official Communication issued by the European Patent Office in Application No. 09009101.8 dated May 10, 2012.

M.S. Smith, et al., "Optimum designs for superpressure ballons". Elsevier Ltd. 2004 COSPAR.

Office Action issued by the Japanese Patent Office in Japanese Application No. 2008-184143 dated Aug. 28, 2012.

* cited by examiner 4
5
CENTER LINE OF
BULGING CORE 3
7
3
6

4
3
GORE 3 BULGING
BETWEEN VERTICAL
ROPES 4

4
3
7
R(l'/L')

GORE 103 BULGING BETWEEN ROPES 104

PRIOR ART

PRESSURE TIGHT LARGE-SCALED MEMBRANE STRUCTURE

BACKGROUND OF THE INVENTION

1. Field of the Invention

The present invention relates to a pressure tight large-scaled membrane structure, and more particularly to a pressure tight large-scaled membrane structure which can uniformly deploy all gores.

2. Description of the Related Art

A scientific balloon taking a flight in an upper stratosphere having a height between 30 and 50 km is called as a zero-pressure type balloon, and generally loads a lot of ballasts. In the zero-pressure type balloon, the ballasts are dropped every night at a fixed rate with respect to a total floating weight. Generally, a temperature of a lifting gas (helium or hydrogen) within the balloon is lowered in the night, and a volume thereof becomes small accordingly, and buoyancy of the balloon is reduced. The reduction of the buoyancy of the balloon causes a reduction of a flying height of the balloon. With regard to this, it is possible to prevent the flying height of the balloon from being lowered due to the reduction of the buoyancy, by dropping the ballasts every night at the fixed rate from the balloon, as mentioned above. As a matter of fact, in the zero-pressure type balloon, if the ballasts loaded at the beginning are all consumed, it is impossible to continue the flying.

On the other hand, as a technique by which the flying height is kept constant, a super pressure type balloon is known. The super pressure type balloon is provided with a closed pressure tight gas bag which can stand up to a pressure difference between inner and outer sides. In the super pressure type balloon, even if the temperature of the lifting gas within the balloon is lowered in the night, only the internal pressure is reduced. Further, it is possible to regulate so as to prevent the internal pressure from becoming smaller than an ambient atmospheric pressure even in the case that the temperature of the lifting gas within the balloon becomes lowest, by sealing a previously regulated amount of lifting gas in the gas bag. Accordingly, in the super pressure type balloon, the volume thereof is not changed between day and night, and a fixed flying height is maintained over day and night. As a matter of fact, the super pressure type balloon requires a gas bag having a pressure tight membrane structure which can stand up to a high pressure difference generated in accordance with a temperature rise (about 30 degrees higher than the night) of the lifting gas generated in the daytime.

As the balloon having the gas bag of the pressure tight membrane structure mentioned above, there has been known a lobed pumpkin type balloon corresponding to one kind of a pumpkin type balloon. In this case, the pumpkin type balloon is structured such as to have a balloon shape which is mathematically defined in accordance with a relational expression called as Euler's Elastica. Specifically, in the case that reference symbol R denotes a maximum radius of a balloon, reference symbol r denotes a distance from a balloon symmetrical axis (a balloon radius) at a point on a balloon surface, reference symbol s denotes a length along a meridian from a nadir of the balloon of the balloon surface and reference symbol θ denotes an angle formed between an outward normal line of the balloon surface and a horizontal surface, an axially symmetrical balloon surface satisfies a relational expression $d\theta/ds = -2r/R^2$.

A volume of the pumpkin type balloon becomes maximum in the case that a length L' from the nadir of the meridian line to a zenith is fixed. In the relational expression expressed by the Euler's Elastica, it means a shape corresponding to a shape in which a pressure difference is infinitely large, however, an actual pressure difference between inside and outside of the balloon is a finite value. As a matter of fact, the actual pressure difference is an enough large value to disregard a weight of a membrane and a pressure gradient of a gas in a vertical direction. Accordingly, in fact, it can be said that the shape of the pressure tight balloon is expressed by the relational expression of Euler's Elastica mentioned above. In the balloon having the shape shown by the relational expression, a tension exists only in a direction of the meridian regardless of a magnitude of an internal pressure. Further, there is such a feature that the tension in a circumferential direction comes to 0 everywhere. Accordingly, it is assumed that the membrane has an excess film in the circumferential direction.

In this case, a significant point at which the tension becomes infinitely large is generated at a point such as the nadir and the zenith at which a perimeter of the balloon is 0. Further, the gore of the pumpkin type balloon is designed such that a length from the nadir of the meridian to the zenith expressed by the Euler's Elastica mentioned above comes to a length of a center line, and a value obtained by dividing the circumferential length of the balloon at each of positions on the meridian by a number N of the gore comes to a width at a corresponding position. A total length of the gore of the pumpkin type balloon comes to a total length L' of the meridian of the pumpkin type balloon.

FIG. 7A is a perspective view showing a construction example of a conventional lobed pumpkin type balloon. FIG. 7B is a side view showing the construction example of the conventional lobed pumpkin type balloon. Further, FIG. 7C is a top view showing the construction example of the conventional lobed pumpkin type balloon. A gas bag 102 of the lobed pumpkin type balloon is provided with a gore 103 of the normal pumpkin type balloon mentioned above, and a rope (called as load rope) 104 which is shorter than a total length of the gore and does not stretch, as shown in FIGS. 7A, 7B and 7C. Further, the rope 104 is fixed in such a manner that the adjacent gores 103 are attached to each other, the membrane (the gore 103) is uniformly shortened (or gathered) in a longitudinal direction, and a wrinkle is formed in a horizontal direction (a lateral direction) (for example, see Unexamined Japanese Patent Application KOKAI Publication No. 2000-025695).

The membrane of the gore does not stretch even in a state in which the pressure is not applied, by manufacturing as mentioned above, and each of the gores comes to a three-dimensional shape bulging toward an outer side (an outer portion of the balloon) while keeping a natural state. Further, since each of the gores 103 is gathered (shortened) by the rope 104 so as to be fixed, infinitude of wrinkles are formed in the lateral direction on the surface of the membrane. Accordingly, the tension is not generated in the direction of the meridian (the vertical direction) corresponding to a direction crossing over the wrinkles. Further, the tension generated in the circumferential direction (the lateral direction) becomes very small due to a small bulging radius of curvature caused by the large bulge of the gore 103. As a result, the lobed pumpkin type balloon has dramatically high pressure resistant in comparison with a spherical balloon as typified by a rubber balloon and an ordinary pumpkin type balloon having no bulge of the gore 103.

In this case, the rope 104 called as the load rope which can stand up to the large tension is fixed along a joint portion of the adjacent gores 103 of the pumpkin type balloon. Further, all the tensions generated in the membrane (all the tensions generated in the direction of the meridian) are to be shared by the rope 104. This is achieved on the assumption that the total length L' of the gore 103 is longer than the rope 104, and the tension is not transmitted to the nadir and the zenith. In other words, it is on the assumption that 1'/L'<1 is satisfied in the case that the total length of the rope 104 is set to 1'.

FIG. 8 is an explanatory view showing a correspondence between the gore (the pumpkin type gore) in the conventional lobed pumpkin type balloon and the rope. If the rope 104 having the shorter total length than the gore 103 is fixed to the joint portion of the gores 103, the wrinkles are uniformly formed in the gore (the membrane) 103 as shown in FIG. 8. Accordingly, infinitude of wrinkles are generated in the lateral direction on the surface of the gore 103, and the tension is not generated in the direction of the meridian (the vertical direction) corresponding to the direction crossing over the wrinkles. Further, it is possible to avoid the matter that such a significant point that the membrane tension becomes infinitely large is generated in the nadir and the zenith.

As a result, each of the gores 103, that is, the membrane plays a part in keeping an airtightness while being exposed to the internal pressure only. At this time, if each of the gores 103 forms a bulge having a smaller radius of curvature in comparison with a radius of the balloon, it is possible to provide only a small circumferential tension in each of the gores 103. In this case, it should be paid attention to the matter the joint portion of the gores 103 of the pumpkin type balloon is shortened at a rate 1'/L'. Since the shape expressed by the relational expression of the Euler's Elastica mentioned above is always a similar figure, it is known that a balloon which is one size smaller and has a magnitude 1'/L' is formed. In other words, it is known that the balloon is automatically shortened at the same rate in the circumferential direction.

In this case, since the total length of the meridian of the balloon comes to the shorter length 1', the radius of the balloon becomes shorter from R to R×(1'/L'). Accordingly, a width which is necessary around one gore 103 in an equator portion comes to a shorter width 2πR×(1'/L')/N. Accordingly, the width of the gore 103 becomes surplus at such a length as to be shown by a rate (1−1')/L' with respect to the necessary width. Therefore, each of the gores 103 can bulge with a small radius of curvature to an outer side even in a natural state in which the pressure is not applied.

The balloon explained above is called as the lobed pumpkin type balloon. In accordance with the definition mentioned above, the balloon shape (in this case, since the lobed pumpkin type balloon is not axisymmetric any more, the shape formed by the rope 104 is called as the balloon shape) is decided independently from the bulging amount of each of the gores 103. In this gore 103, in accordance that the bulging amount is made larger, and the radius of curvature is made smaller, the generated circumferential tension becomes smaller. Accordingly, as far as the same membrane material is used, the membrane can be made thin, however, an area of the membrane is increased. Further, if the bulging amount is increased, the meridian of the bulge center portion becomes longer at that degree. Accordingly, the following problem is generated until the shortening rate in the direction of the meridian is made larger than that in the circumferential direction. In other words, since the gore 103 extends in the circumferential direction until the wrinkle is not formed, and necessarily stretches further in the direction of the meridian, the tension is generated in the direction of the meridian as a result. In accordance with the fact mentioned above, a suitable value exists in the shortening rate for itself.

As shown above, in the lobed pumpkin type balloon, the stretch of the gore 103 is not the assumption. Further, since only the small tension is generated, it is possible to form the membrane by a very thin material. Accordingly, it is possible to manufacture by making a total weight of the balloon small.

Further, as the other method, there can be considered a method of fixing the gore 103 in which its width is made 1'/L' time the original one while keeping the length L' to the rope 104 having a length 1'. In this case, if the pressure difference is 0, the same radius of curvature as the radius of the balloon is formed in the membrane in the circumferential direction. Accordingly, if the pressure difference is generated, the membrane immediately stretches in the circumferential direction. Further, on the contrary, there can be considered a method of making the length of the rope 104 L' that is equal to the length of the gore 103 and making the width larger than the original width. In this case, the length of the meridian runs short in the bulging portion, and the gore 103 stretches in the direction of the meridian (for example, see Proc. 6th AFCRL Scientific Balloon Symposium, J. H. smalley, 1970, Development of the e-Balloon, 167-176).

As mentioned above, if the structure is made such that the bulge is formed dependently on the extension of the gore 103, a large tension is generated even if the pressure difference is small. As a result, it is hard to reduce the weight of the balloon such that the high tensile strength is necessary in the membrane, the very thick membrane is necessary and the like.

The force caused by the pressure difference between the inner and outer sides finally comes to the tension in the direction of the meridian, that is, the tension of the rope 104. Accordingly, the rope 104 which can stand up to the tension is necessary. Further, the weight of the rope 104 occupies a major part of the balloon weight. Accordingly, in the lobed pumpkin type balloon having the maximum volume in which the length of the meridian is fixed, it is possible to minimize the weight of the rope 104 per volume, that is, the weight of the rope 104 with respect to the generated buoyancy. Only one practical method which can manufacture the pressure tight balloon having the small weight and the large capacity is to manufacture the lobed pumpkin type balloon as mentioned above. The practical pressure tight balloon which can reach the upper stratosphere having the height between 30 and 50 km can not be manufactured by other methods than this.

In this case, the lobed pumpkin type balloon necessarily comes to the shape mentioned above by applying the internal pressure, in the case that the sufficient membrane exists in the circumferential direction. On the contrary, it is only one balloon which can be manufactured only by the rope 104 in the direction of the meridian without being constrained in the circumferential direction. If any portion in which the membrane comes short exists in the circumferential direction, the stress is concentrated there.

In the lobed pumpkin type balloon having the structure mentioned above, the rope portion is formed as the shape called as the Euler's Elastica, and its shape is defined only by the length 1' of the rope 104 regardless of an amount of the membrane existing therebetween. Accordingly, since the membrane which is surplus in the circumferential direction has a uniform distribution, the shape in which all the gores 103 bulges uniformly to the outer side, that is, all the ropes 104 are arranged at even intervals does not come to only one shape both mathematically and physically.

For example, there is considered a case that three of N number of gores 103 overlap tightly. Even in this case, the shape as the balloon is maintained with no problem as far as the relation 1−(1'/L')>2/N is established. Since the rope 104 is positioned on the predetermined circumference which has been already defined by the Euler's Elastica, the rope 104 does not move any more to the outer side. Further, since the number which is two smaller than N of ropes 104 are already arranged side by side at even interval on the circumference, the force of such a circumferential component as to rearrange the rope 104 in the circumferential direction is not generated from the pressure difference and the gravity applied to the membrane.

However, in this case, since the gore 103 comes short at two, the bulge of the remaining gores 103 becomes smaller at the short amount. Accordingly, the radius of curvature of each of the bulges becomes large, and the pressure resistance of the lobed pumpkin type balloon is significantly lowered.

Further, even in the case that a state in which the deviation of the gore 103 as mentioned above is generated is changed in each of the cross section which is vertical to the symmetrical axis of the balloon, the shape of the balloon is kept in the same manner. Accordingly, there is a case that the different arranged condition of the gores 103 is generated in every height of the balloon. In this case, the balloon comes to the shape which accompanies torsion. The generation of the phenomenon mentioned above is indicated mathematically. Further, for example, it is confirmed by experiments (for example, see Buckling of Structures, I. Elishakoff et al., Elsevier Science Ltd, 1988, 133-149).

There is shown that the phenomenon mentioned above tends to be generated in accordance with an increase of the number of the gores 103, and an enlargement of the surplus of the circumferential length (for example, see Buckling of Structures, I. Elishakoff et al., Elsevier Science Ltd, 1988, 133-149). In other words, although the small-sized lobed pumpkin type balloon can be easily achieved, the large-sized lobed pumpkin type balloon is hard to be achieved.

The problem mentioned above means the following matter. In other words, the shape of the balloon is physically determined on the basis of the length of the rope 104. On the other hand, since the arrangement of the surplus of the gores 103 is affected by the phenomenon generated by a change of a process reaching the final shape, such as a state of a folded balloon (an initial state), an expanding process of the balloon, various disturbances generated in the expanding process, it means that the gores are not necessarily evenly deployed. The fact that there is a case that all the gores 103 are not deployed, and the torsion structure is generated is confirmed actually by experiments (for example, see Buckling of Structures, I. Elishakoff et al., Elsevier Science Ltd, 1988, 133-149). If the phenomenon mentioned above is generated in the expanding process of the rising balloon, there is generated a problem that it is impossible to obtain a performance which is sufficient as the pressure tight balloon.

As a similar technique to the pressure tight balloon mentioned above, there has been known an airship for stratosphere flying at the height about 20 km (for example, see Unexamined Japanese Patent Application KOKAI Publication No. 2002-002595). The airship for stratosphere is structured such that intersecting cables are arranged as a ship body, and an approximately quadrangular membrane is arranged within each of meshes formed by the cables and is fixed to the cables, and is bulged to an outer side due to a differential pressure between inner and outer sides so as to reduce a membrane tension. This is an absolutely different technique from the lobed pumpkin type balloon in the following points.

First of all, in the airship for stratosphere, the membrane is divided into approximately quadrangular small curved surfaces. On the contrary, in the lobed pumpkin type balloon or the general balloon for stratosphere, a portion from a head portion to a tail portion is covered by one slender spindle shaped gore 103. Accordingly, the lobed pumpkin type balloon and the general balloon for stratosphere brings a high reliability on the basis of a reduction of weight, an easiness of manufacturing, an inexistence of stress concentrating point such as four corners of the divided curved surface, a reduced number of joints, and the like, as is different from the airship for stratosphere.

Further, in the airship for stratosphere, the flat membrane expands and bulges on the basis of the pressure. Accordingly, in the case that the airship for stratosphere is formed locally as an approximately spherical surface, a large elongation in two axial directions of the membrane is demanded with respect to a predetermined pressure difference. As a result, a large tension is generated.

On the contrary, in the lobed pumpkin type balloon, the long gore 103 is fixed to the short rope 104 while being shortened. Accordingly, a wrinkle is formed in a lateral direction by the surplus in the direction of the meridian. Therefore, the lobed pumpkin type balloon does not expand in the direction of the meridian, and the tension is not generated therein. Further, it can bulge in a state of nature in the circumferential direction on the basis of the surplus in the circumferential direction. In other words, it is possible to form a circular arc in the circumferential direction even in the case that the pressure difference is 0.

Further, in the airship for stratosphere, the ship body shape constructed by the membrane and the rope is maintained. Accordingly, a constraint rope for preventing each of the portions of the ship body from expanding in the circumferential direction is necessary all over a whole. In this case, FIG. 1 of Unexamined Japanese Patent Application KOKAI Publication No. 2002-002595 shows a configuration in which a circumferential cable is arranged partly. However, this is a cross section that the membrane in the circumferential direction comes short with respect to its necessary amount in such a manner that a portion which is not constrained in the circumferential direction comes to the shape shown by the Euler's Elastica on the basis of the internal pressure. In this case, it only bulges to a radius which is equal to a radius from a center axis of the airship, and a free shape is not formed by the rope and the membrane surface.

On the contrary, in the lobed pumpkin type balloon, the balloon shape is defined only by the rope 104 in the vertical direction. Accordingly, the rope constraining in the circumferential direction is not necessary. In other words, the lobed pumpkin type balloon comes to the shape of the Euler's Elastica corresponding to the only one final shape naturally without any rope in the circumferential direction, if a necessary amount of membrane is provided. On the other hand, a strength required for the rope 104 in the direction of the meridian is essentially equal to a strength of the vertical rope used in the airship mentioned above. Accordingly, the lobed pumpkin type balloon can be manufactured light at an amount that the rope in the circumferential direction is not necessary, as is different from the airship for stratosphere. Further, the shape of the lobed pumpkin type is a shape having the maximum capacity among objects having the same meridian length. Accordingly, it is possible to make buoyancy per unit weight very large in comparison with the airship for stratosphere. As a result, the lobed pumpkin type can fly at the height about 40 km at the same weight as the airship for stratosphere flying at the height 20 km.

As mentioned above, in the lobed pumpkin type balloon, the bulge of each of the gores 103 is formed in such a manner that the generation of the tension is suppressed to the minimum, with respect to the balloon shape (the shape formed by the rope 104 portion) which is automatically defined by the length of the rope 104, in other words, is not necessarily formed uniformly. As mentioned above, since a stable final shape is not guaranteed, and the pressure resistance is not guaranteed with respect to the large-scaled lobed pumpkin type balloon having a large number of gores 103, there is a problem that it is hard to put the large-scaled super pressure balloon to practical use.

As mentioned above, the deployment of the lobed pumpkin type balloon having the large number of gores 103 is not guaranteed because the shape of the balloon is defined on the basis of the length of the rope 104, and the arrangement in the circumferential direction of the rope 104 depends only on an opening degree of the gore 103. In other words, the shape of the balloon is defined on the basis of the length of the rope 104, and the length necessary in the circumferential direction at each cross section which are vertical to the symmetrical axis of the balloon (the length of one circle, that is, the circumferential length of the circle formed by the rope 104) is uniquely defined.

On the other hand, the surplus exists in length and breadth of the gore 103 in such a manner that each of the gores 103 bulges to the outer side without extending. For example, the width of the gore 103 is a length which is 5% longer than an essentially necessary width (a value obtained by dividing the length of one circle mentioned above by the number of the gores). Since the rope 104 exists in an inner side of a predetermined position until a total of the width of the gores 103 gets over a necessary length in the circumferential direction, each of the gores 103 expands securely toward the outer side. However, at a time point when the condition is satisfied by the deployment of the length which is necessary for just one circle, the balloon shape expressed by the Euler's Elastica of the relational expression mentioned above reaches the final shape. Accordingly, the internal pressure becomes higher than the external pressure thereafter.

Accordingly, the gore 103 which does not open at this time point, that is, is kept being overlapped is pressed to the outer side as it is due to the pressure difference. The force for expanding right and left against this is very small. If the deployed rope 104 is uniformly arranged, the force comes to 0. Accordingly, there is generated such a problem that the remaining gore 103 is fixed as it is without being deployed.

If all the gores 103 expand from the beginning in a state of being open uniformly little by little, the problem as mentioned above is not generated. However, in order to expand all the gores 103 in the uniformly open state from the beginning, it is necessary that the balloon itself expands from its equator portion. The expansion mentioned above can be achieved only in the case that the balloon is expanded by filling the air which is of a gas in the balloon suspended from the ceiling in the air. However, actually, the balloon starts rising in a state in which the lighter lifting gas (helium or hydrogen) than the air is filled only a part of the head portion of the balloon which is finely folded in the vertical direction. Further, the lifting gas existing only in the head portion is expanded to the outer side together with the rise of the height and further to the lower side. Accordingly, the gore 103 of the balloon is deployed in sequence from the top. Therefore, it is impossible to deploy the balloon from the center portion thereof.

SUMMARY OF THE INVENTION

The present invention is made for the purpose of solving the problem mentioned above, and an object thereof is to provide a pressure tight large-scaled membrane structure which can deploy all gores uniformly.

In order to achieve the object, according to the present invention, there is provided a pressure tight large-scaled membrane structure comprising:

a bag body having a plurality of gores attached to each other along an attachment line, and a plurality of first ropes attached over a predetermined range of the bag body in such a manner as to be orthogonal to the attachment line of the gores, whereby a cylindrical shaped portion is formed, wherein the cylindrical shaped portion has a substantially circular cross-sectional area that is a maximum substantially circular cross-section of the bag body and the plurality of first ropes each having approximately the same length as a circumference of the substantially circular-cross section having a maximum area with respect to the bag body.

In the pressure tight large-scaled membrane structure, the structure may be made such that the cylinder shaped portion at a time of forming the bag body is formed as an approximately rectangular shape, in the gores, and the other portions are formed in such a manner as to come to a shape according to a relational expression of Euler's Elastica, at a time of forming the bag body.

In the pressure tight large-scaled membrane structure, the structure may be made such that a plurality of second ropes each is shorter than the length of the gore are attached to each of the plurality of attachment lines over two end points of the bag body while forming wrinkles in the attachment line, and the total length of each of the plurality of first ropes is shorter than a summation of maximum widths of the plurality of gores, wherein the plurality of first ropes and second ropes intersect at intersecting points, and each of the plurality of first ropes is attached to the plurality of second ropes at the intersecting points, thereby being attached such that a polygonal inscribed in a substantially circular-cross section of the bag body in which the area becomes maximum is formed.

In the pressure tight large-scaled membrane structure, the structure may be made such that a density at which the wrinkle is formed is different between the attachment line of the cylindrical shape portion and the attachment line near two end points of the bag body.

In the pressure tight large-scaled membrane structure, the structure may be made such that the first rope and the second rope are structured such that a strength ratio becomes equal to twice an aspect ratio of a quadrangle formed by setting the second rope to a vertical side and the first rope to a lateral side.

In the pressure tight large-scaled membrane structure, the structure may be made such that the bag body is provided with one ring in each of both end portions, and both end portions of the second rope are bound to the two rings, respectively.

In the pressure tight large-scaled membrane structure, a material of the gore may be a polyethylene complex film. Further, in the pressure tight large-scaled membrane structure, a material of the first rope and the second rope may be a high strength organic fiber.

The pressure tight large-scaled membrane structure may be constructed by a pressure tight balloon provided with the bag body as a gas bag.

In the pressure tight large-scaled membrane structure, the structure may be made such that a plurality of second ropes each having a length which is equal to a length of the gore is attached to the plurality of attachment lines over two end points of the bag body, and the total length of each of the plurality of first ropes is shorter than a summation of maximum widths of the plurality of gores, wherein the plurality of first ropes and second ropes intersect at intersecting points, and each of the plurality of first ropes is attached to the plurality of second ropes at the intersecting points, thereby being attached such that a polygon inscribed in a substantially circular-cross section of the bag body in which the area becomes maximum is formed.

In accordance with the present invention, it is possible to provide the pressure tight large-scaled membrane structure which can uniformly deploy all the gores.

BRIEF DESCRIPTION OF THE DRAWINGS

These objects and other objects and advantages of the present invention will become more apparent upon reading of the following detailed description and the accompanying drawings in which:

FIG. 1A is a side view showing the structure example of the pressure tight balloon. FIG. 1B is a top view showing the structure example of the pressure tight balloon. FIG. 1C is a cross sectional view of the pressure tight balloon in an equator portion in FIG. 1A.

FIG. 7A is a perspective view showing a structure example of a conventional pumpkin type balloon. FIG. 7B is a side view showing the structure example of the conventional lobed pumpkin type balloon. FIG. 7C is a top view showing the structure example of the conventional lobed pumpkin type balloon.

DETAILED DESCRIPTION OF THE PREFERRED EMBODIMENT

A description will be given below of a best mode for carrying out the present invention.

In order to solve the problem mentioned above, the balloon may be structured as follows.

In other words, the balloon may be structured such that the balloon does not come to a final full expansion even at a time point when the gore of the balloon is deployed to a circumferential length defined by a length of the rope, and such a circumferential force that each of the gores forcibly and uniformly opens to the end.

Accordingly, first of all, a description will be given of the structure of the pressure tight balloon according to the present embodiment in which the deploying force mentioned above is generated, with reference to the accompanying drawings.

Figure 1A:
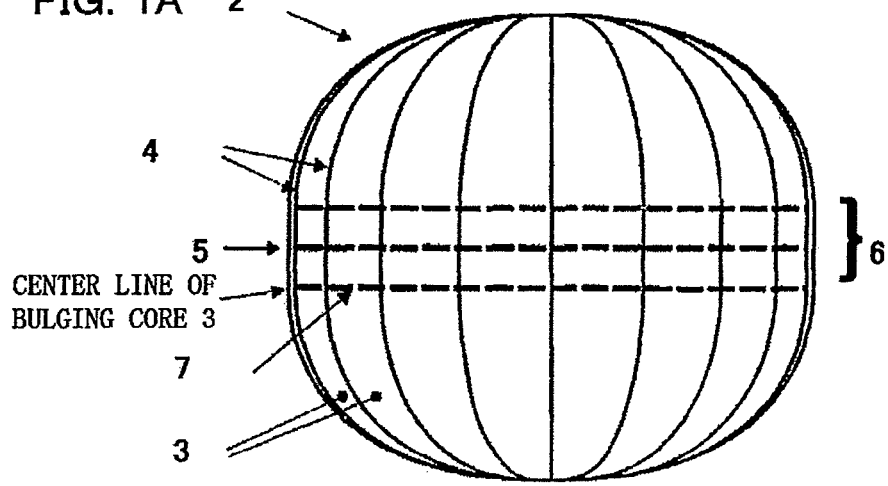
FIGS. 1A, 1B and 1C are views showing a structure example of a pressure tight balloon according to the present embodiment.
Figure 1B:
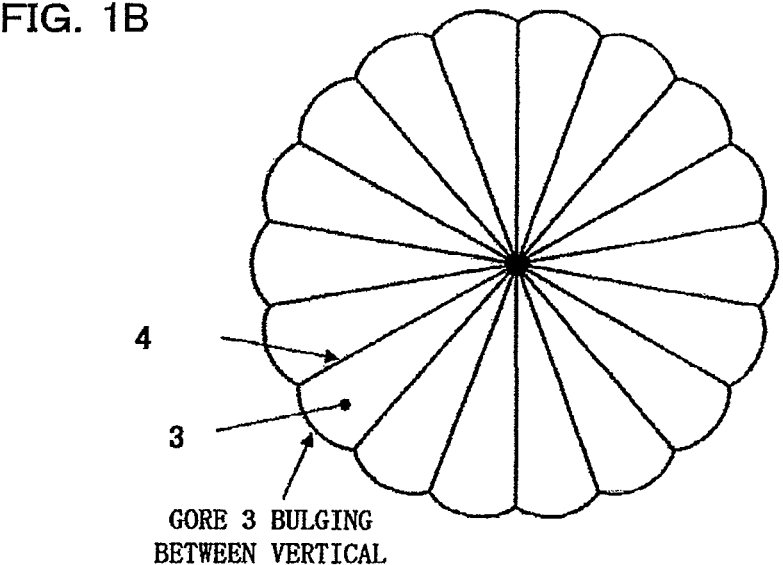
Figure 1C:
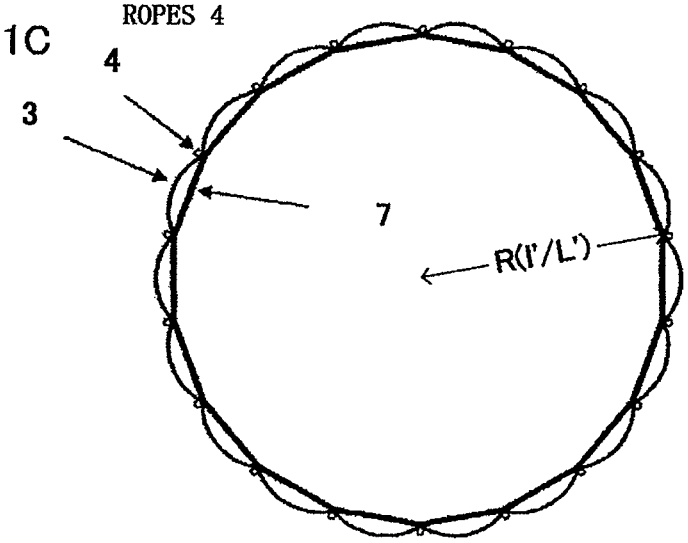

The pressure tight balloon according to the present embodiment shown in FIGS. 1A, 1B and 1C are structured on the basis of the pumpkin type balloon. In this case, the pumpkin type balloon is provided with a balloon shape which is mathematically defined by the following relational expression called as Euler's Elastica.

Specifically, in the case that reference symbol R denotes a maximum radius of the balloon, reference symbol r denotes a distance from a balloon symmetrical axis at a point on a balloon surface (a balloon radius of the point), reference symbol s denotes a length along a meridian from a balloon nadir of the balloon surface, reference symbol $\theta$ denotes an angle formed by an outward normal line of the balloon surface and a horizontal surface, the surface of the balloon which is axisymmetrical satisfies the relational expression $d\theta/ds=-2r/R^2$.

In the pumpkin type balloon, its volume becomes maximum in the case that a length L' from the nadir of the meridian to a zenith is fixed. The gore of the pumpkin type balloon is formed such that the length from the nadir to the zenith of the meridian expressed by the Euler's Elastica mentioned above comes to a length of a center line, and a value obtained by dividing a circumferential length of the balloon at each of positions on the meridian by the number N of the gores comes to a width at the corresponding position.

In the case that reference symbol L' denotes a total length of the gores of the pumpkin type balloon, that is, a total length of the meridians of the pumpkin type balloon, it is possible to approximately express a maximum radius at a time when the balloon is fully expanded, that is, a radius R of an equator portion, a height H of the balloon, a surface area S of the balloon, a volume V of the balloon, and a maximum width c of the gore of the pumpkin type balloon, as follows, respectively.

R=0.3814 L'
H=0.4569 L'
S=1.4355 L'$^2$
V=0.1523 L'$^3$
C=2$\pi$R/N

Figure 7A:
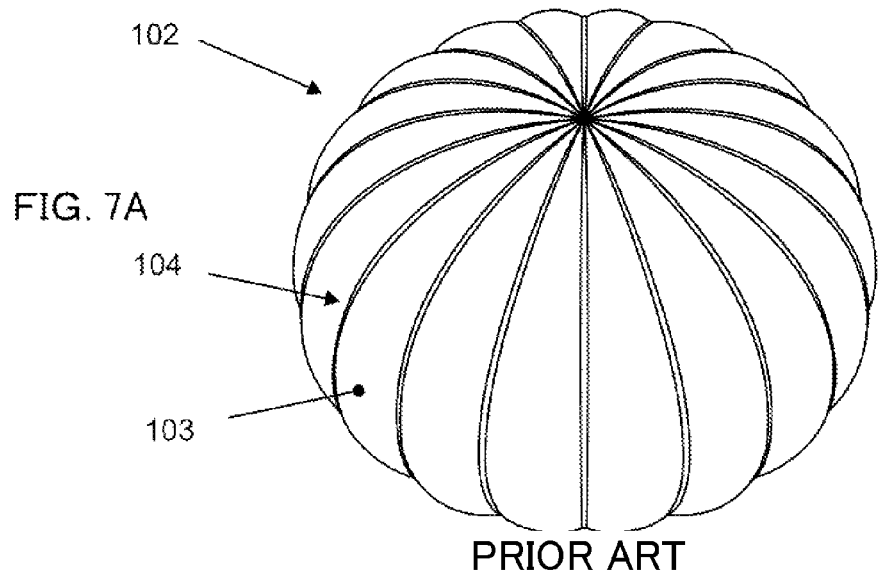
FIGS. 7A, 7B and 7C are views showing a structure example of a conventional lobed pumpkin type balloon.
Figure 7B:
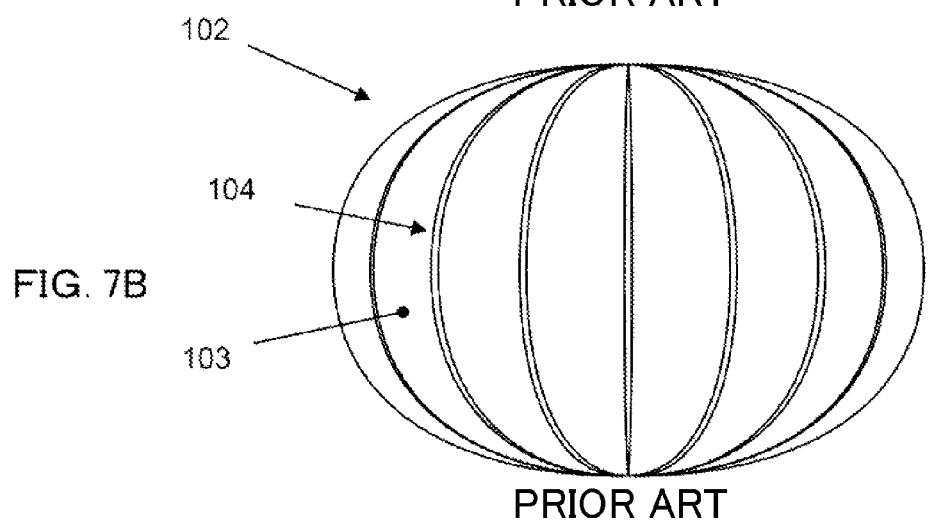

As shown in FIGS. 1A, 1B and 1C, the pressure tight balloon is based on a lobed pumpkin type balloon shown in FIG. 7 corresponding to one kind of the pumpkin type balloon which is expressed by the relational expression of the Euler's Elastica mentioned above in the final fill expansion. Further, in the pressure tight balloon, a columnar cylinder portion 6 having a radius R×(1'/L') is formed near an equator portion 5. Hereinafter, the balloon mentioned above is called as a lobed pumpkin with lobed cylinder type balloon.

The pressure tight balloon is provided with a gas bag 2. Buoyancy is generated in the balloon by filling a light gas, for example, helium and hydrogen in an inner portion of the gas bag 2. The gas bag 2 is structured such as to hold a pressure of the gas in the inner portion without discharging a lifting gas for rising buoyancy even after the full expansion. Further, a payload such as an observation device (not shown) is suspended from the gas bag 2.

The gas bag 2 is structured such that a plurality of gores 3 which are uniformly divided vertically and have an approximately spindle shape are attached to each other in their side edge portions. The gore 3 is formed by a membrane material which is thin and light and has a high airtightness, for example, a polyethylene complex plastic film. Further, a vertical rope 4 which can stand up to a large tension is attached to the gore 3 along its attaching line.

The vertical rope 4 has a function of holding the load of the payload, and preventing a significant point from being generated on the balloon, in addition to the function of forming the shape of the balloon. The vertical rope 4 is excellent in a tensile strength, and is formed by a material such as a high strength organic fiber having a small elongation. As the high strength organic fiber mentioned above, there can be listed up, for example, an aramid fiber, a high molecular weight polyethylene fiber, an ultra high molecular weight polyethylene fiber, a polybenzazole fiber, a polyarylate fiber, a polyester high strength fiber, an aromatic polyamide fiber. They may be used as one kind single, or may be used as two or more kinds together.

A plurality of ropes (horizontal ropes) 7 are inserted to an inner surface of the cylinder portion 6 at even intervals, the ropes connecting the points where the vertical ropes 4 lie in sequence and having a regular polygonal shape. The horizontal rope 7 is formed by the same material as the vertical rope 4. Further, they are provided at even interval positions including both ends of the cylinder portion 6. The horizontal ropes 7 are connected to each other at the intersecting points to the vertical ropes 4, but are not attached to the membrane at the other points.

In this case, in the pressure tight balloon as mentioned above, the tension in the vertical direction is not generated at any position of the balloon membrane in the same manner as the based lobed pumpkin type balloon shown in FIG. 7. Further, it is constrained by the horizontal ropes 7 in such a manner that the shape of the cylinder portion 6 holds the same shape as the equator cross section of the based lobed pumpkin type balloon shown in FIG. 7.

Figure 2:
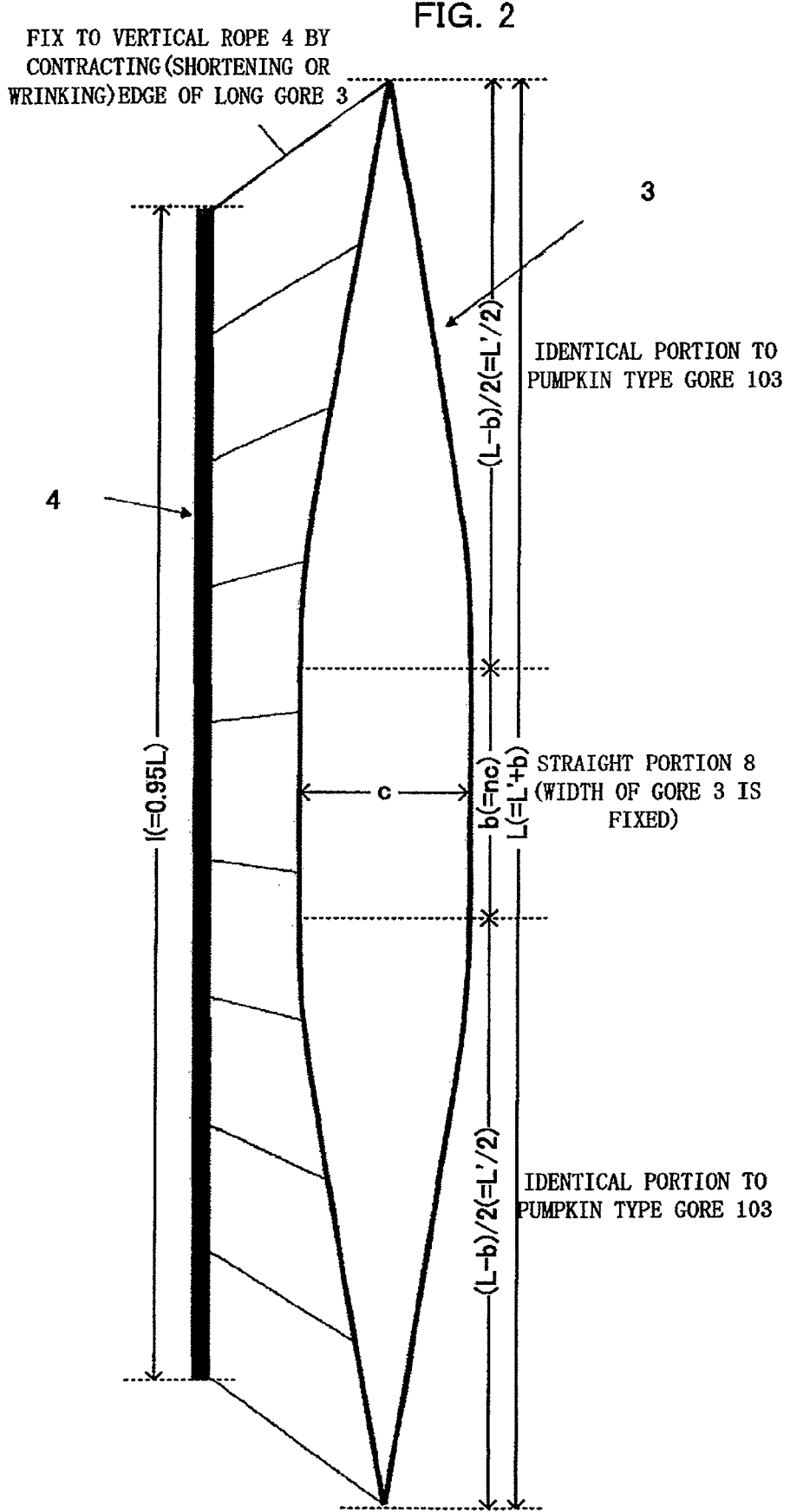
FIG. 2 is an explanatory view exemplifying a correspondence between a gore and a vertical rope in the pressure tight balloon according to the present embodiment.

As shown in FIG. 2, each of the gores 4 has a shape of a pumpkin type gore in which a straight portion 8 is formed near a center portion (a pumpkin type gore with straight). A width is fixed in the straight portion 8, and is identical to a width c of an equator portion 105 of a based pumpkin type gore 103 shown in FIG. 8. A length b of the straight portion 8 comes to an integral multiple, for example, twice to sevenfold the width c. The straight portion 8 forms the cylinder portion 6 shown in FIG. 1A at a time of forming the balloon shape.

Further, at this time, the same bulging shape as the individual bulging shape of the equator portion 105 in the lobed pumpkin type balloon is formed over the total length of the extended cylinder portion 6, shown in FIG. 7. On the other hand, this section is fixed to the vertical rope 4 while the membrane is shortened and wrinkled, as shown in FIG. 2, in the vertical direction, in the same manner as the other sections.

Further, a plurality of horizontal ropes 7 shown in FIG. 1 are installed in an inner face of the straight portion 8 in which the width of the gore 3 is fixed (an inside surface at a time when the balloon is formed).

In accordance with the structure mentioned above, the pressure tight balloon bulges from the head portion in sequence by the light lifting gas, for example, helium. Further, in a process that the equator portion 5 bulges, the tension is generated in the horizontal rope 7 due to the internal pressure in the cylinder portion 6, and an outward bulging force goes on generating to such a shape that the circumferential length is constrained. Further, since the horizontal rope 7 is connected to the vertical rope 4, that is, an edge of each of the gores 3, it is possible to expand securely. Further, in order to fully expand the horizontal rope 7, each of the gores 3 deploys uniformly. As a result, in the cylinder portion 6, it is impossible to generate a phenomenon that a part of the gores 3 is left. Further, the gore 3 is uniformly deployed. Since the vertical rope 4 reaches the shape expressed by the relational expression of the Euler's Elastica mentioned above only after the horizontal rope 7 is fully extended, the vertical rope 4 does not prevent the full expansion of the equator portion 5.

Since the total length of the cylinder portion 6 is securely deployed, a uniform deployment is promoted automatically in upper and lower portions connecting it, that is, the corresponding region except the equator portion 105 of the based lobed pumpkin type balloon shown in FIG. 7. Because, for example, even in the case that a part of the gores 3 is not deployed just above the cylinder portion 6, such a circumferential force that all the gores 3 are uniformly deployed is transmitted to the gore 3 just above the cylinder portion 6.

Even in the based lobed pumpkin type balloon shown in FIG. 7, if the equator portion 105 having the largest diameter is normally deployed, the other portions are securely deployed sequentially. Further, once it is deployed, each of the gores 103 is uniformly expanded for itself. The longer the cylinder portion 6 is, the greater the deploying force is, and reliability and stability after the deployment are increased, however, it is not necessary to elongate unnecessarily. For example, it is sufficient that the length of the cylinder portion 6 is severalfold (twice to sevenfold) the width of the gore 3 in the equator portion 5.

Next, a description will be given of a manufacturing method of the pressure tight balloon provided with the structure mentioned above with reference to the accompanying drawings.

Figure 8:
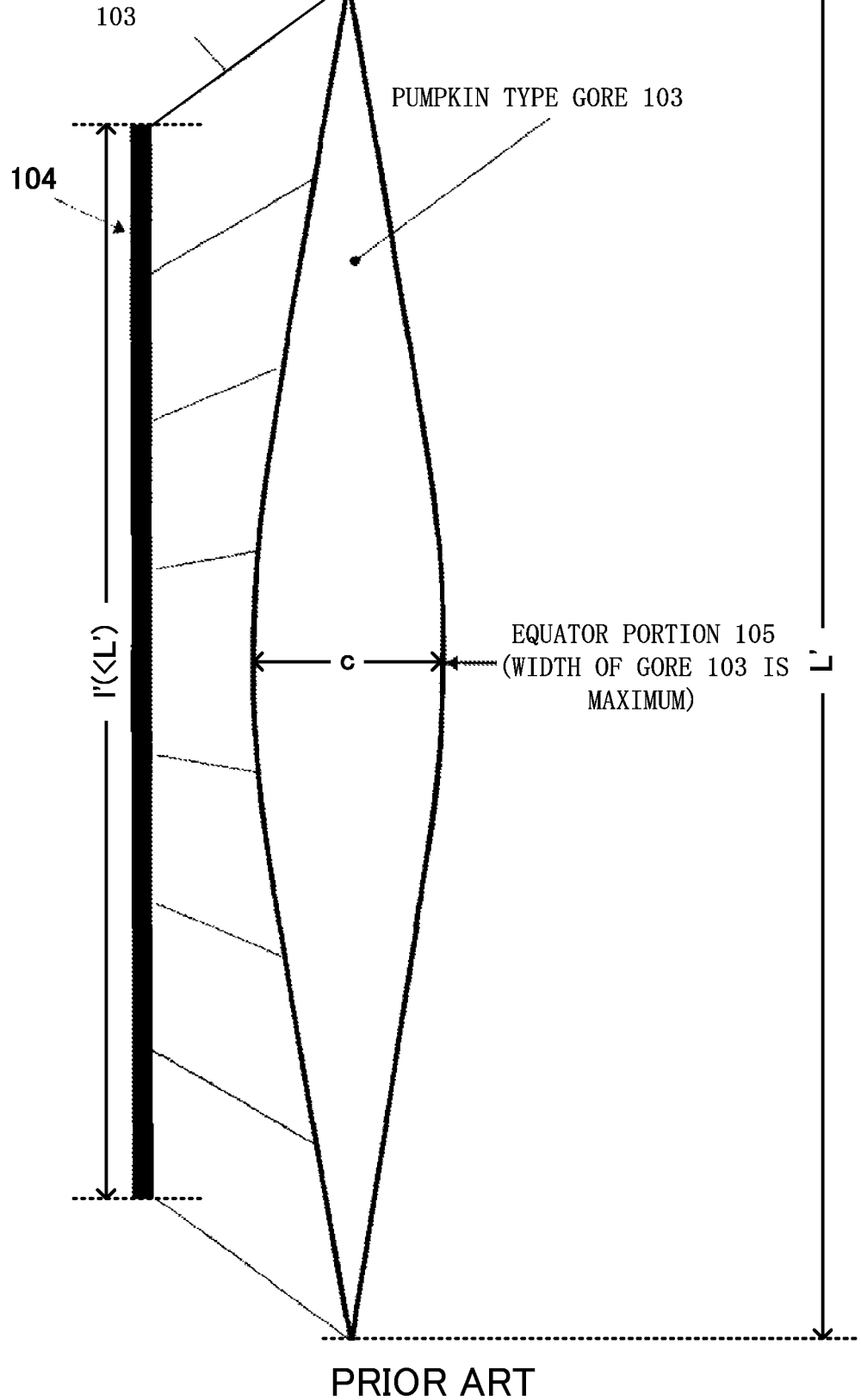
FIG. 8 is an explanatory view exemplifying a correspondence between a gore and a vertical rope in the conventional pumpkin type balloon.

As shown in FIG. 2, a novel gore 3 is formed in such a manner that a straight portion 8 having a width of an equator portion 105 in the gore 103 of the conventional pumpkin type balloon shown in FIG. 8 is added near the center portion, and N number of gores 3 are prepared. A total length of the gore 3 is set to L (=L'+b), and a length of the straight portion 8 is set to b, and is set to an integral multiple of a gore width c in the equator portion 5 (n=b/c, which is 1 or more). The gore 3 as mentioned above is called as a pumpkin type gore with straight.

A total length 1 of the vertical rope 4 is set to a length which is shorter than the total length L of the gore 3 (for example, 95% length of L, that is, 1/L=0.95).

The closed horizontal rope 7 is prepared on the equator cross section of the lobed pumpkin type balloon shown in FIG. 7, the closed horizontal rope 7 having a length which is equal to a circumferential length of a regular N-angled polygon inscribed in a circle having a radius R×(1'/L') formed by the vertical rope 4. A necessary number is (n+1) which is one larger than a value obtained by dividing the length b of the straight portion 8 of the gore 3 by the gore width c in the equator portion 5. Further, a strength of the horizontal rope 7 is twice a strength of the vertical rope 4.

The short vertical rope 4 is attached to the portion at which the adjacent gores 3 are attached. At this time, in a state in which the gore 3 is shortened while being wrinkled uniformly over a total length, or adversely in a state in which the vertical rope 4 is extended in conformity to the total length of the gore 3, the vertical rope 4 and the portion above the joint portion of the outer surface (the portion forming the outer side of the balloon) of the gore 3 or the portion near the same are attached to each other so as to be fixed. Accordingly, each of the gores 3 bulges at a small radius of curvature to the outer side of the balloon without the membrane material stretch. The wrinkle is formed in the lateral direction on the surface of the gore 3, the tension is not generated in the vertical direction of the gore 3, and the radius of curvature is small, the tension in the horizontal direction of the gore 3 becomes smaller.

Figure 3:
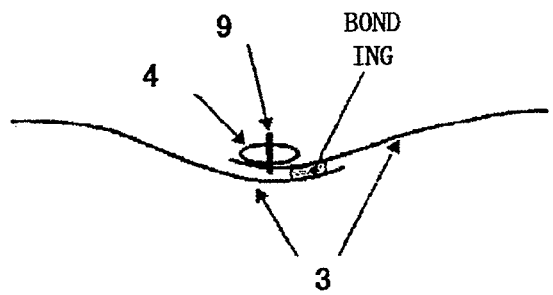
FIG. 3 is a view exemplifying a relational structure between the gore and the vertical rope.

The attaching method of the vertical rope 4 mentioned above, for example, expands a roll-shaped film, and cuts the gore 3 which is one size larger at a width of a attaching margin than the conventional pumpkin type gore 103 shown in FIG. 8, as shown in FIG. 3. Further, the adjacent gores 3 are superposed so as to be bonded or thermally welded, in such a manner that the original edges come to the same position. Further, the vertical rope 4 is sewn to a remaining lug portion just outside the bonded portion (the bonded line) of the gore 3 coming to the outer side of the balloon by a fixing yarn 9. At a time of sewing, it is possible to make the feed of the gore 3 side larger than the feed of the vertical rope 4, for example, by using an apparatus such as a gather sewing machine which can feed the upper and lower materials at different feeding speeds. In accordance with the structure mentioned above, it is possible to uniformly shorten the gore 3 so as to fix to the vertical rope 4.

Figure 4A:
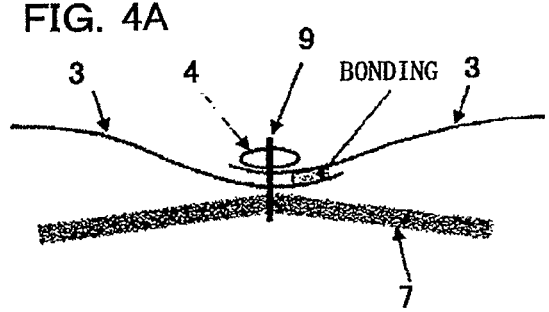
FIGS. 4A and 4B are views exemplifying a relational structure among the gore, the vertical rope and a horizontal rope.
Figure 4B:
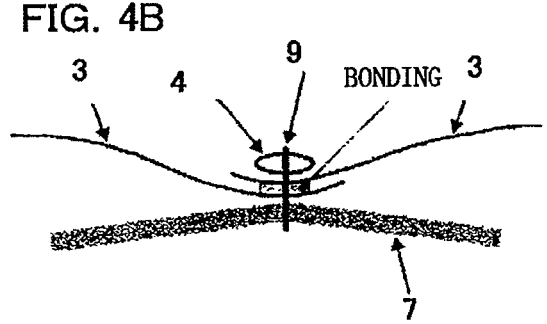

As shown in FIGS. 4A and 4B, in the straight portion 8 of the gore 3, the horizontal ropes 7 (including both end portions of the straight portion 8, having an interval c) are uniformly fixed to the vertical rope 4 intersecting from the inner side of the membrane (the portion coming to the inner surface of the balloon) through the membrane.

Further, the horizontal rope 7 is fixed only at the intersecting point to the vertical rope 4, and is not fixed to the membrane.

In this case, the horizontal rope 7 is formed as an annularly closed shape. A total length thereof is shorter than the summation of maximum widths (the width c shown in FIG. 2) of all of a plurality of gores, for example, may be shorter about 5%. Specifically, it is equalized to the length of the outer circumference of the regular N-angled polygon inscribed in the circle having the radius which is equal to R×(1'/L') of the equator portion 105 in the lobed pumpkin type balloon formed from the based pumpkin type gore 103 shown in FIG. 8, in which the straight portion 8 is not formed. Accordingly, a bulge having the same shape as the bulge of the equator of the conventional lobed pumpkin type balloon shown in FIG. 7 is formed in the cylinder portion 6. In other words, there is formed the lobed cylinder shape having the same shape as the bulge of the equator portion 105 of the conventional lobed pumpkin type balloon. In the present embodiment, the quadrangle formed by the intersecting points between the horizontal ropes 7 and the vertical ropes 4 in the cylinder portion 6 is a quadrate. Accordingly, a strength of the horizontal rope 7 is set twice the strength of the vertical rope 4.

Figure 5:
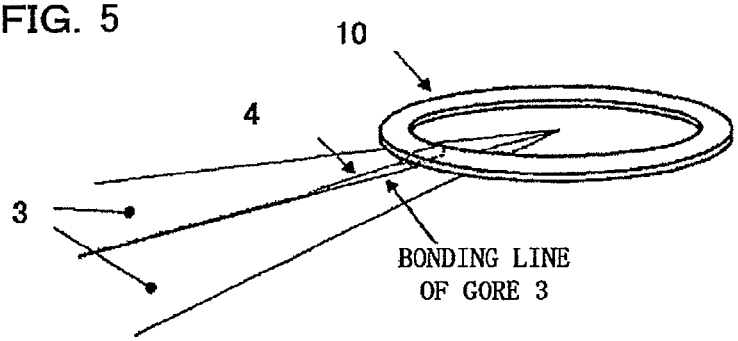
FIG. 5 is an explanatory view exemplifying a handling method of an end portion of the vertical rope.

Further, the vertical ropes 4 are collected to the head portion and the tail portion, however, are radially connected to an anchor ring 10 having a diameter about 1 m, as shown in FIG. 5. A tension caused by a pressure difference between the inner and outer sides of the balloon is held finally by two anchor rings 10. In the present embodiment, the anchor ring 10 is formed by a metal having a high specific strength, however, may be formed by a high tensile strength fiber. The vertical rope 4 goes in the vicinity of the anchor ring 10 while being detached from the joint line of the gore 3 so as to be bound to the anchor ring 10. The gore 3 which is closer to the end portion side than the portion in which the vertical rope 4 is detached is structured such that only the gores 3 are attached. Accordingly, in the inner side of the anchor ring 10, the membrane is pinched and fixed from upper and lower sides by a thin disc or the like, and an airtightness is held by a packing or the like pinched therebetween. A filling port (not shown) for filling the lifting gas is provided on the disc in the inner side of the anchor ring 10 close to the head portion side.

The fully expanded shape of the balloon formed as mentioned above comes to a shape obtained by vertically elongating the equator portion 105 of the based lobed pumpkin type balloon shown in FIG. 7 at a predetermined length, as shown in FIG. 1A. At this time, the same bulge shape as the bulge shape of the equator portion 105 of the based lobed pumpkin type balloon is formed over the total length of the cylinder portion 6. On the other hand, in this section, the membrane is shortened and wrinkled in the vertical direction in the same manner as the other section. Accordingly, the tension in the vertical direction is not generated. The shape of the cylinder portion 6 is constrained by the horizontal rope 7 and the cross sectional shape is maintained.

As explained above, in the pressure tight balloon in the present embodiment, the bulge having the small radius of curvature is formed in the circumferential direction in every places of each of the gores 3. Accordingly, the light membrane structure which can stand up to the large pressure difference is formed. Further, the pressure tight balloon has the cylinder portion 6 which is not defined by the relational expression of the Euler's Elastica mentioned above in the equator portion 5. Therefore, it is possible to securely and uniformly deploy all the gores 3. This structure is especially effective in the large-scaled balloon having the large number of gores 3, and it is possible to achieve the large-sized super pressure type balloon.

Further, it is possible to form the pressure tight balloon so as to have a volume which is very close to a maximum volume having a fixed meridian, by forming the equator surface 105 of the conventional lobed pumpkin type balloon shown in FIG. 7 as a slightly elongated shape. As a result, it is possible to achieve a large-scaled super pressure balloon, for example, which can float the observation device having a weight equal to or more than 1 ton within 2 ton in the upper stratosphere having the height equal to or higher than 30 km, while maintaining approximately the same performance as the performance of the lobed pumpkin type balloon.

Further, in accordance with the pressure tight balloon in the present embodiment, there can be obtained such an effect that the very large balloon can be easily manufactured. In the general balloon, the diameter of the balloon becomes larger in proportion to one third power of the volume. Further, since the maximum width of the membrane material is limited, the number of the gores is increased in proportion thereto. If the number of the gores is increased, the number of the gores and the ropes getting together in the head portion and the tail portion becomes very large. Further, in order to bring them together, it is necessary to enlarge the sizes of the head portion and the tail portion in proportion to the diameter of the balloon. This makes the manufacturing and the handling of the balloon hard, and causes the increase of the weight of the balloon.

On the contrary, in accordance with the pressure tight balloon in the present embodiment, it is possible to increase the length of the cylinder portion 6 (that is, elongate the portion having the maximum diameter) while keeping the diameter (that is, the number of the gores 3) constant, thereby easily increasing the volumetric capacity. Accordingly, the total weight of the balloon is never disadvantageous in comparison with the balloon in accordance with the general manufacturing method. On the other hand, it is not necessary to change the number of the gores 3 getting together in the head portion and the tail portion. In the shape of the gore 3, only the length of the straight portion 8 having the maximum width may be changed. Accordingly, not only it is easy to design and manufacture, but also it is possible to downsize the head portion and the tail portion, and it is possible to reduce the weight of the balloon. In this case, the manufacturing method mentioned above can be applied to the other general balloon than the pressure tight balloon according to the present embodiment.

In this case, the present invention is not limited to the embodiment mentioned above, but can be variously modified and applied. A description will be given below of a modified mode of the embodiment which is applicable to the present invention.

In the embodiment mentioned above, the description is given on the assumption that the quadrangle formed by the intersecting points between the vertical rope 4 and the horizontal rope 7 in the cylinder portion 6 is the quadrate. However, the present invention is not limited to this. The quadrangle formed by the intersecting points between the vertical ropes 4 and the horizontal ropes 7 may be the rectangle. In this case, in order to equalize a safe magnification ratio of the horizontal rope 7 to a safe magnification ratio of the vertical rope 4, it is necessary to change the strength ratio between the vertical rope 4 and the horizontal rope 4 in correspondence to the aspect ratio. For example, since the aspect ratio is 1:2 in the case of 2b=c, the strength of the horizontal rope 7 becomes equal to the strength of the vertical rope 4.

In the embodiment mentioned above, the description is given of the horizontal rope 7 which is installed as the polygonal shape in the inner side of the pressure tight balloon. However, the present invention is not limited to this, but may be structured such as to be installed to the outer side of the pressure tight balloon. In this case, the length of the horizontal rope 7 may be set to a length which is equal to the circumferential length of the circle formed by the rope 104 in the cross section in the equator portion 105 of the lobed pumpkin type balloon formed from the pumpkin type gore 103 having no straight portion 8 shown in FIG. 8, that is, the circumferential length of the circle having the radius R×(1'/L') of the equator portion 105. Accordingly, the diameter of the cylinder portion 6 is constrained in the same manner as the embodiment mentioned above. Further, the bulge having the same shape as the bulge of the equator portion 5 of the pressure tight balloon according to the embodiment mentioned above is formed in the cylinder portion 6 except the vicinity of the horizontal rope 7.

As a result, the bulge of the membrane in the portion with which the horizontal rope 7 comes into contact is lost, however, since the circumferential length of the portion of the gore 3 with which the horizontal rope 7 comes into contact, that is, the membrane becomes longer than the total length of the horizontal rope 7, the wrinkle is formed in the vicinity of the horizontal rope 7 in the same manner as the vertical direction, and the tension in the circumferential direction in the vicinity of the horizontal rope 7 comes to 0 so as to come to a non-existing state. Further, the small circumferential tension is generated in the same manner as the embodiment in the circumferential direction of the membrane except the vicinity of the horizontal rope 7, due to the small bulging radius of curvature. In this case, the horizontal rope 7 is connected only in the intersecting point to the vertical rope 4, and is not fixed to the membrane.

In the embodiment mentioned above, the description is given on the assumption that the local value of the ratio between the length of the vertical rope 4 and the length of the gore 3 is constant. In other words, the description is given on the assumption that the shortening rate is uniform in every place. However, the present invention is not limited to this. The local value (the density) of the ratio between the length of the vertical rope 4 and the length of the gore 3 may be different in accordance with the places. For example, it is easy to manufacture by setting the value large in the portion of the gore 3 which has the narrow width and is close to the head portion and the tail portion, and it is possible to approximate the bulge shape between the vertical ropes 4 to the most preferable shape by reverse setting.

In the embodiment mentioned above, the description is given on the assumption that the side line portion of the gore 3 and the vertical rope 4 are fixed while the membrane is shortened at the fixed rate. However, the present invention is not limited to this. The rate that the membrane is shortened may be changed in accordance with the place. For example, the rate of contraction may be set large in the portion close to equator portion 5 in which the bulge is large, and the rate of shortening may be set small in the portion close to the anchor ring 10 in which the width of the gore 3 is narrow. Further, the rate of shortening may be set to an independent value from the rate of surplus of the width of the gore 3.

If the rate of shortening is changed in accordance with the place and the direction as mentioned above, the manufacturing process becomes complicated, however, it is possible to manufacture the pressure tight balloon which is optimized and lighter in weight.

In the present embodiment, the description is given on the assumption that the total length of the vertical rope 4 is shorter than the total length of the gore 3. However, the present invention is not limited to this. The total length of the vertical rope 4 may be set to a length which is equal to the total length of the gore 3. For example, the case that the width of the gore 3 is very small in comparison with the length of the gore 3 is assumed. In other words, there is assumed the case that the balloon is very large, and the case that the number of the gore 3 is very large. In these cases, the surplus amount of the gore 3 in the direction of the meridian which is necessary for achieving the bulge having the same radius of curvature without any elongation in the vertical direction of the gore 3 comes to a very small amount. Further, this can be sufficiently compensated by the gore 3 elongating at a very small amount in the direction of the meridian. In this case, the tension generated in the vertical direction in the gore 3 comes to a sufficiently small value.

In the embodiment mentioned above, the description is given by exemplifying the pressure tight balloon to which the pressure tight large-scaled membrane structure in according to the present invention is applied. However, the present invention is not limited to this, but can be applied to the other thin membrane structure.

Figure 6:
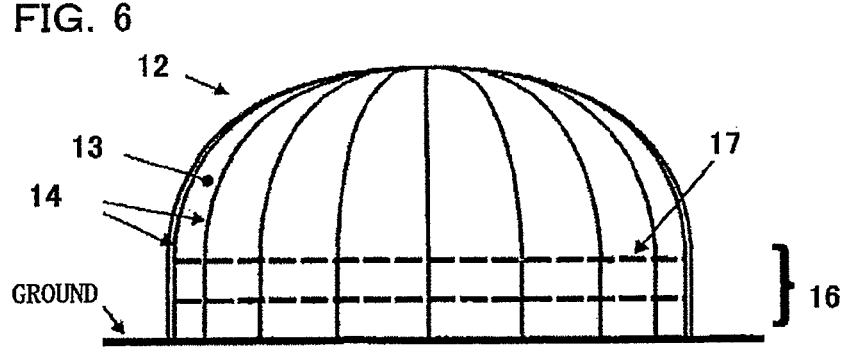
FIG. 6 is a view showing a structure example of a thin membrane structure according to a modification.

FIG. 6 is a view showing a structure example of a thin membrane structure according to a modification. The thin membrane structure (a gas bag 12) shown in FIG. 6 has a structure in which a gore 13 comes to a straight portion from a head portion. Further, in an end close to the straight side, a vertical rope 14 and a membrane are fixed by an anchor embedded in the ground in such a manner as to stand up to a force in an upward direction (in the direction of the meridian) caused by the internal pressure. It is possible to apply, for example, to an all-weather large-scaled architectural structure by applying a pressure to an inner portion of the thin membrane structure (the gas bag 12) so as to hold an outer shape. At this time, a tension of the vertical rope 14 becomes larger in proportion to a magnitude of the structure, however, since a strength is not demanded in the membrane itself, it is possible to form it very thin. Accordingly, it is possible to form, for example, a roof which can completely transmit the light. Further, it is possible to freely set a height of the thin membrane structure (the gas bag 12) by regulating a length (a height) of the cylinder portion 16.

Further, the length of the cylinder portion may not be short, but may be long. As an extreme case, there can be considered a cylindrical pressure tight thin membrane structure in which both ends are round and elongated. For example, it is possible to apply to a case that a thin membrane structure having a small air resistance such as an airship is formed light.

Further, in the embodiment, the description is given on the assumption that the gas is filled within the balloon. However, the present invention is not limited to this, but may be structured such that a pressure difference is generated in the membrane surface. For example, a liquid such as water, a small granular solid such as a sand may be filled. In accordance with this structure, the thin membrane structure can be used as a thin, light and foldable container. Further, a volume and a shape which correspond to an amount of the filled liquid or solid are automatically set. Accordingly, it is possible to prevent a useless cavity region which is not filled from being generated.

The present invention can securely deploy all the gores and stably maintain the full expansion state without deteriorating the pressure tightness even in the case that the number of the gores is increased. Further, it is possible to form pressure tight balloons having various volumes without changing the diameter.

Further, the present invention can be utilized as follows in addition to the pressure tight balloon flying in the upper stratosphere.

According to the present invention, it is possible to form lightly the thin membrane structure such as the large-scaled architectural structure in which the large-scaled stable bottom surface is approximately circular. For example, there can be considered a mobile simple architectural structure which becomes very small by being folded, completely transmits the light and can be expanded by the air. In this case, a shape only by the upper half is formed in the middle of the straight portion.

Further, it is possible to utilize as the pressure tight container storing the gas. In this case, it may be folded when that it is not used.

Further, it is possible to utilize as a light and foldable container of the liquid such as the water or the sand-like granular solid.

Further, if the straight portion is elongated, it is possible to lightly form the elongated pressure tight balloon which can be used as the airship.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-184143 filed on Jul. 15, 2008 and including specification, claims, drawings and summary. The disclosure of the above Japanese Patent Application is incorporated herein by reference in its entirety.

Figure 7C:
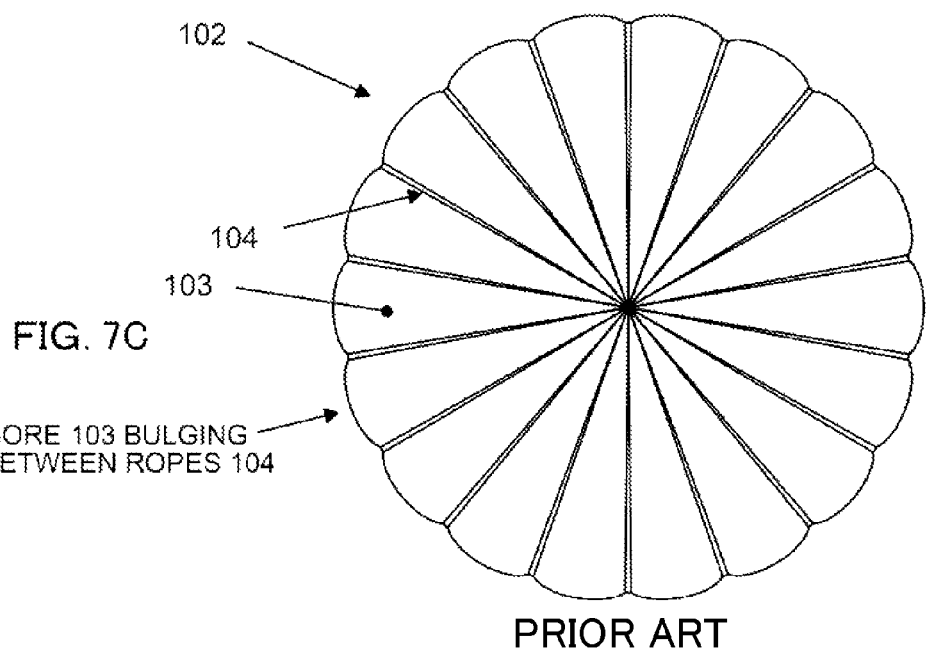

FIG. 1A
 CENTER LINE OF BULGING GORE 3
FIG. 1B
 GORE 3 BULGING BETWEEN VERTICAL ROPES 4
FIG. 2
 FIX TO VERTICAL ROPE 4 BY CONTRACTING (SHORTENING OR WRINKLING) EDGE OF LONG GORE 3
 IDENTICAL PORTION TO PUMPKIN TYPE GORE 103
 STRAIGHT PORTION 8 (WIDTH OF GORE 3 IS FIXED)
 IDENTICAL PORTION TO PUMPKIN TYPE GORE 103
FIG. 3/FIG. 4A/FIG. 4B
 BONDING
FIG. 5
 BONDING LINE OF GORE 3
FIG. 6
 GROUND
FIG. 7C
 GORE 103 BULGING BETWEEN ROPES 104

FIG. 8
 FIX TO VERTICAL ROPE 104 BY CONTRACTING (SHORTENING OR WRINKLING) EDGE OF LONG GORE 103
 PUMPKIN TYPE GORE 103
 EQUATOR PORTION 105 (WIDTH OF GORE 103 IS MAXIMUM)

What is claimed is:

1. A pressure tight large-scaled membrane structure comprising:
 a bag body formed from having a plurality of gores;
 a plurality of first ropes; and
 a plurality of second ropes, wherein
 each of the plurality of the gores comprises a middle gore portion and upper and lower gore portions arranged at top and bottom ends of the middle gore portion;
 the bag body before inflation comprises:
  a cylindrical-like portion composed of the middle gore portions;
  an upper bag body portion composed of the upper gore portions; and
  a lower bad body portion composed of the lower gore portions;
 the upper and lower bag body portions comprises shapes obtained by dividing a shape according to a relational expression of Euler's Elastica at an equator having a maximum radius thereof;
 each of the plurality of the first ropes is disposed to the bag body so as to be orthogonal to meridians of the bag body; and
 each of the plurality of the second ropes is disposed along one of the meridians from a zenith to a nadir of the bag body.

2. The pressure tight large-scaled membrane structure according to claim 1, wherein the pressure tight large-scaled membrane structure is constructed by a pressure tight balloon provided with the bag body as a gas bag.

3. The pressure tight large-scaled membrane structure according to claim 1 wherein:
 each of the plurality of the first ropes is shorter than a total width of the middle gore portions of the plurality of the gores and is disposed to the cylindrical-like portion so as to be orthogonal to the meridians of the bag body; and
 each of the plurality of the second ropes is shorter than a length of each of the plurality of the gores and is disposed to form wrinkles on the plurality of the gores along one of the meridians from the zenith to the nadir of the bag body.

4. The pressure tight large-scaled membrane structure according to claim 3, wherein a density at which the wrinkles are formed is different between the cylindrical-like portion and vicinity of the zenith and nadir of the bag body.

5. The pressure tight large-scaled membrane structure according to claim 3, wherein a first ratio of a length of the each of the plurality of the first ropes to the total width of the middle gore portions is approximately equal to a second ratio of a length of the each of the plurality of the second ropes to a length of the each of the plurality of the gores.

6. The pressure tight large-scaled membrane structure according to claim 5, wherein the first and second ratios are approximately 95%.

7. The pressure tight large-scaled membrane structure according to claim 1, wherein the bag body is provided with two rings, each ring being disposed at the zenith and the nadir, and each end of the each of the plurality of the second ropes is bound to each of the two rings.

8. The pressure tight large-scaled membrane structure according to claim 1, wherein the plurality of the first ropes and the plurality of second ropes intersect at intersecting points, and the each of the plurality of the first ropes is attached to the plurality of the second ropes at intersecting points, thereby being attached such that a polygonal inscribed in a substantially circular-cross section of the cylindrical-like portion is formed.

9. The pressure tight large-scaled membrane structure according to claim 1, wherein the plurality of the first ropes and the plurality of the second ropes intersect at intersecting points, and the each of the plurality of the first ropes is attached to the plurality of the second ropes at intersecting points, thereby being attached such that a polygonal circumscribed in a substantially circular-cross section of the cylindrical-like portion is formed.

10. The pressure tight large-scaled membrane structure according claim 1, wherein a first ratio of a length of the each of the plurality of the first ropes to a total width of the middle gore portions is approximately equal to a second ratio of a length of the each of the plurality of the second ropes to a length of the each of the plurality of the gores.

\* \* \* \* \*